United States Patent
Rydgren et al.

(10) Patent No.: US 7,389,123 B2
(45) Date of Patent: Jun. 17, 2008

(54) MOBILE APPARATUS WITH REMOTE LOCK AND CONTROL FUNCTION

(75) Inventors: Ake Rydgren, Sodra Sandby (SE); Magnus Jendbro, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 267 days.

(21) Appl. No.: 10/554,490

(22) PCT Filed: Apr. 28, 2004

(86) PCT No.: PCT/EP2004/050628
§ 371 (c)(1), (2), (4) Date: Oct. 24, 2005

(87) PCT Pub. No.: WO2004/098219
PCT Pub. Date: Nov. 11, 2004

(65) Prior Publication Data
US 2006/0276172 A1   Dec. 7, 2006

Related U.S. Application Data

(60) Provisional application No. 60/468,433, filed on May 7, 2003.

(30) Foreign Application Priority Data
Apr. 29, 2003   (EP)   ................................... 03445048

(51) Int. Cl.
*H04M 1/00* (2006.01)
(52) U.S. Cl. ................... 455/550.1; 455/410; 455/466; 455/558; 455/419; 235/382; 340/5.6

(58) Field of Classification Search ............. 455/550.1, 455/558, 410–411, 418–420, 456.1–457, 455/466, 422.1; 235/375, 380, 382; 340/5.6–5.8, 340/10.51; 379/356.01, 357.01, 357.02, 379/357.06
See application file for complete search history.

(56) References Cited

U.S. PATENT DOCUMENTS 6,011,976 A * 1/2000 Michaels et al. ........... 455/466

(Continued)

FOREIGN PATENT DOCUMENTS

EP   1170969 A1   1/2002

(Continued)

OTHER PUBLICATIONS

International Search Report corresponding to European Application No. PCT/EP04/050628 mailed Sep. 7, 2004.

(Continued)

*Primary Examiner*—George Eng
*Assistant Examiner*—Kamran Afshar
(74) *Attorney, Agent, or Firm*—Myers Bigel Sibley & Sajovec, PA

(57) ABSTRACT

A mobile communication apparatus includes a remote lock and control function. More particularly, after theft or loss of the apparatus, it is possible to remotely lock the apparatus by sending a lock command, e.g. an SMS message. The apparatus may also be controlled to upload information enabling the user to retrieve valuable information stored in the apparatus. The apparatus includes a control unit and registers for controlling the operations of the apparatus, including receiving messages. The apparatus further includes locking means capable of detecting codes in messages received and, responsive to detecting a lock code, sending a lock command to the control unit to render the mobile communication apparatus at least partially inoperable.

11 Claims, 1 Drawing Sheet

U.S. PATENT DOCUMENTS

| | | | |
|---|---|---|---|
| 6,064,880 A | 5/2000 | Alanara | |
| 6,081,704 A * | 6/2000 | Oshima | 455/410 |
| 6,141,564 A * | 10/2000 | Bruner et al. | 455/558 |
| 6,216,015 B1 * | 4/2001 | Hymel | 455/558 |
| 6,662,023 B1 * | 12/2003 | Helle | 455/558 |
| 6,763,249 B2 * | 7/2004 | Shirai | 455/558 |
| 6,813,498 B1 * | 11/2004 | Durga et al. | 455/456.1 |
| 7,054,613 B2 * | 5/2006 | Smeets | 455/410 |
| 7,054,624 B2 * | 5/2006 | Cocita | 455/419 |
| 2003/0054840 A1 | 3/2003 | Ito | |
| 2003/0119554 A1 * | 6/2003 | Horn | 455/558 |
| 2004/0204092 A1 * | 10/2004 | Sato | 455/558 |
| 2006/0154649 A1 * | 7/2006 | Pedersen et al. | 455/412.1 |

FOREIGN PATENT DOCUMENTS

| | | |
|---|---|---|
| GB | 2380356 A | 4/2003 |
| JP | 2001-078255 A | 3/2001 |

OTHER PUBLICATIONS

International Preliminary Report on Patentability for PCT/EP2004/050628 dated Sep. 11, 2006.

Chinese Office Action corresponding to Chinese Application No. 200480011402.6 mailed Mar. 30, 2007.

* cited by examiner

MOBILE APPARATUS WITH REMOTE LOCK AND CONTROL FUNCTION

Cross-Reference To Related Applications

This application claims priority under 35 U.S.C. 371 from PCT International Application No. PCT/EP2004/050628, filed on Apr. 28, 2004, which claims priority from European Patent Application Serial No. 03445048.6 filed Apr. 29, 2003, and from U.S. Provisional Application Ser. No. 60/468,433 filed May 7, 2003, the disclosures and contents of each of which are incorporated by reference herein in their entireties. The above-referenced PCT International Application was published in the English language as International Publication No. WO 2004/098219.

FIELD OF INVENTION

The present invention relates to a mobile apparatus with a remote lock and control function, more particularly, after theft or loss of the apparatus, it is possible to remotely lock it by sending a lock command, e.g. an SMS message. The apparatus may also be controlled to upload information enabling the user to retrieve valuable information stored in the apparatus.

BACKGROUND OF THE INVENTION

A lot of phones are lost or stolen and these phones contain an increasing amount of private, perhaps sensitive, information. It would be useful if a lost or stolen phone could be completely locked as soon as possible after it is lost by the use of a friend's phone or a web site. The phone lock should be possible to reverse if it is found, so that it immediately can be used with its original information.

There are four actions a user can perform today related to phone theft.

One is to contact the operator and invalidate the IMEI number. After contacting the operator, it typically takes a few days before the phone is invalidated in the network.

The second action is to invalidate the SIM card itself in the network This invalidation will in most cases take only a few minutes to implement in the network.

The third action, which is of a preventive nature, is to use the phone locking mechanism usually implemented in mobile phones, in which case the user must either enter a code at each power on or the phone is automatically locked when used with another SIM card.

The fourth action is to enable the SIM card's PIN code, in which case the phone will be inaccessible while using the locked SIM card unless the correct PIN code is entered. If both phone lock and SIM card PIN is active the user must enter two separate codes at each start-up.

However, invalidating the IMEI does not necessarily prevent access to the phone itself, nor does the SIM card invalidation. Enabling phone lock at each start-up will prevent unauthorised access to data, but locking the phone to one specific SIM card only does not prevent somebody to access the content of the phone, as long as the original SIM card is used. Enabling the SIM card's PIN code will only have an effect after the phone have been powered off and then on again.

The only way to achieve protection of the phone's content and unauthorised use of the SIM card using currently available solutions is to use the phone locking feature described above, in combination with enabling the SIM PIN code. This solution is not optimal since it requires the user to always enter the PIN code every time the phone is powered on, and perhaps even the phone lock code, and the protection is not activated unless the phone first is powered off.

The present invention solves this problem by introducing a remote lock and control function into the phone. Then a user that looses his phone can send a special message, typically an SMS, to his lost phone that will lock the phone.

SUMMARY OF THE INVENTION

The invention provides a mobile communication apparatus capable of communicating via a telecommunication network, comprising a control unit and registers for controlling the operation of the apparatus, including receiving messages.

According to the invention, the apparatus further comprises locking means capable of detecting codes in messages received and, in dependence of a lock code, sending a lock command to the control unit for rendering the mobile communication apparatus at least partially inoperable.

Preferably, when rendered partially inoperable, the apparatus is arranged to receive a first unlocking code restoring the apparatus to normal operation.

The apparatus may further comprise a card reader for reading a smart card, such as a SIM card, containing control information necessary for the operation of the apparatus, and the locking means, when activated, is arranged to automatically lock the apparatus when a smart card is replaced by another.

Suitably, when locked, the apparatus is arranged to receive a second unlocking code restoring the apparatus to normal operation.

The first unlocking code may be the same as the second unlocking code.

In one embodiment, the apparatus, when rendered partially inoperable, is arranged to maintain contact with the telecommunication network and to receive commands for remotely controlling operation of the apparatus.

Preferably, the commands include a command to upload specific information from the apparatus, such as phone book, messages, images, settings or other user data, via the telecommunication network to a remote receiver.

The apparatus may be arranged to keep track of its position and to receive a command to upload information about its position via the telecommunication network to a remote receiver.

The apparatus may be arranged to empty all registers after having uploaded specific information from the apparatus to a remote receiver.

The commands may include a command to lock the smart card, so that the smart card cannot be used in another apparatus.

Suitably, the command is a command to activate the SIM card PIN code.

BRIEF DESCRIPTION OF THE DRAWINGS

The invention will be described below in detail with reference to the accompanying drawing, of which the only figure is a schematic view of an apparatus in accordance with the invention connected in a telecommunication network.

DETAILED DESCRIPTION OF EMBODIMENTS OF THE INVENTION

Figure 1:
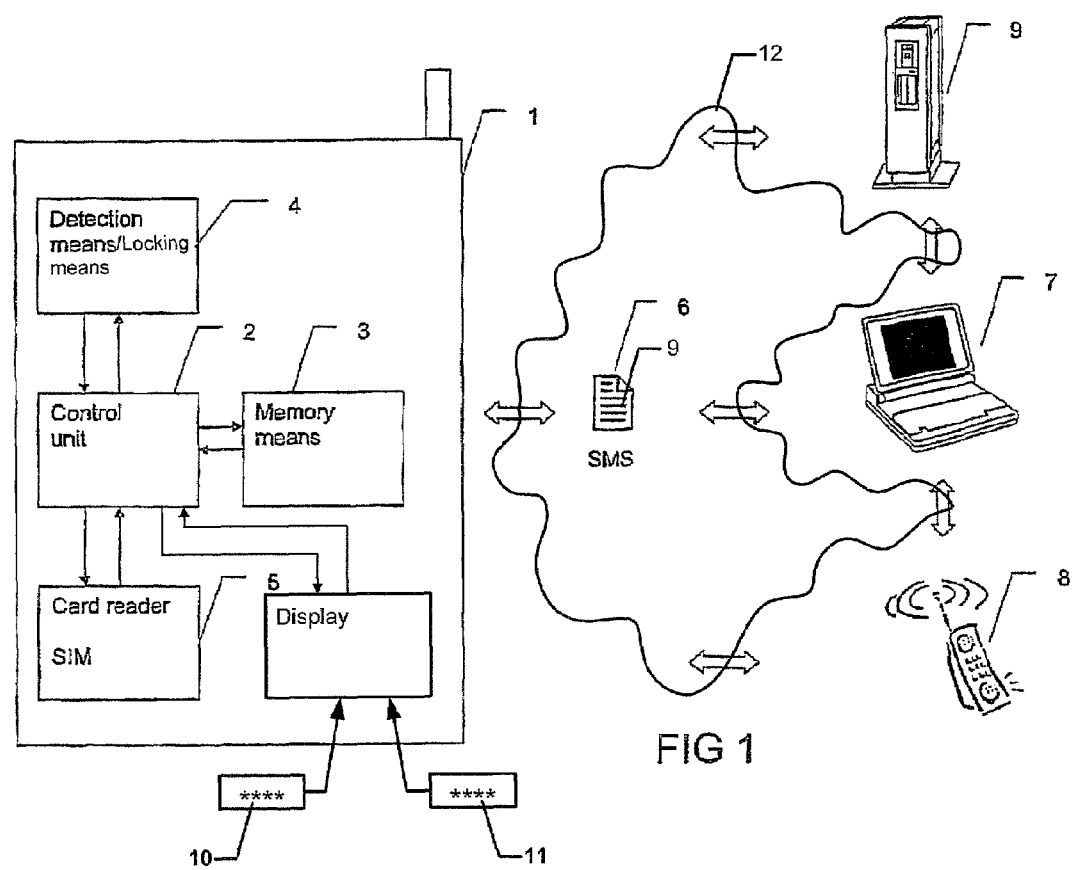

The invention will be described in relation to a mobile phone. The invention is also applicable in other devices, e.g. communicators, electronic organisers and the like portable apparatuses capable of communicating via a telecommunication network.

FIG. 1 shows a mobile phone 1 according to the invention. The phone contains the usual mobile phone functions for handling calls and messages, such as SMS (Short Message Service). The phone also contains a card reader 5 for a SIM card (Subscriber Identity Module) holding information about the phone number and also containing registers available for the user to store information. The phone also contains a built-in register or memory means 3 storing software and other information e.g. settings. The memory means 3 also contains a space available to the user for storing information. All these functions and means are conventional and not described in detail here. The telephone is arranged to communicate with other devices by means of a telecommunication network only symbolised by means of the lock arrows.

The user often spends a lot of efforts loading information into the phone and/or the SIM card, such as messages received and sent, images such as photos, calendars and settings with regard to the operation of the phone, such as ring signals, profiles etc. When the user looses his phone including the SIM card, not only may an unauthorised person use the original user's subscription but also the sensitive and valuable contents of the phone are lost.

With the present invention the user is offered the possibility to lock the phone remotely by sending a special lock command to his phone. Suitably, the command is contained in a message 6 such as an SMS to the phone 1 and may be sent to the phone by another phone 8 or through a web site by means of a connected computer 7. The SMS 6 will contain a code and a specific tag. The phone 1 contains a detection means 4 adapted to detect the code and respond to the code by sending a command to the control unit 2 to render the phone at least partially inoperable, so that the unauthorised person may not use the phone.

The user initiates the function by means of the ordinary phone keys by entering the code, which of course should only be known to the phone owner. Preferably, the code is long, at least twenty characters chosen from the whole character set in order to minimise the probability for a random message sent to the phone to lock the phone accidentally. When the code is set, the user may activate the lock function.

If the original owner gets his phone back he can unlock the phone and continue to use it as before. The user enters an unlocking command and then the phone requests the correct unlocking code to be unlocked. Alternatively, the phone is adapted to request the unlocking code automatically.

As an additional precaution, the SIM card PIN code may be activated, such that the SIM card can not be moved to another phone and be used there without entering the SIM card locking code.

If the user has not activated the SIM card PIN code when the phone is lost, he may activate it by means of another command sent in a message. This command may be sent in the same SMS as the lock command. Alternatively, the lock command may automatically activate the SIM card PIN code.

Also, when the lock function according to the invention is activated the phone should also be locked by means of a conventional phone lock mechanism, such that it can not be used with another SIM card without first unlocking the phone with the proper phone unlocking code 10. This way, the thief may not just switch off the phone and then use it with another SIM card. The user may select the unlocking code 11 according to the invention to be the same as a conventional phone locking code 10.

In one embodiment, the phone remains in contact with the telecommunication network 12 after having received the lock command 9 by means of the SMS 6. Even though the phone is locked for ordinary use it can receive further messages. In accordance with the invention, the phone may further be adapted to receive commands to remotely control the phone. In this way, the original owner may send messages containing codes commanding the phone to upload information through the telecommunication network 12. Preferably, the phone is adapted to upload specific information, like the phone book, e-mails, SMS messages, MMS messages and pictures etc. to a server 9 in the network 12, e.g. run by the telecommunication operator or someone else offering the service. From the server, the original owner may gain access by means of his user identity and a password, which may be identical to the unlocking code 10, for downloading the information to his computer 7 for forwarding e.g. to his new phone 8 or directly to a mobile phone 8.

The phone may also be adapted to keep track of its own position. In this case the specific information may comprise the phone position so that the phone may be found.

A further command could be to empty the phone completely as soon as all the specific information has been uploaded.

During the uploading of information, the phone's display should look normal, so that the upload is invisible to the unauthorised user. In this way it is avoided that the unauthorised user switches off the phone or interferes with the information transfer in another way.

The invention reduces the risk for unauthorised phone and data use when the phone is lost. It secures all valuable data contained in the phone and makes it possible to retrieve the data even if the phone is never recovered. The great advantage of this solution compared to the currently available solutions is that once it is sot up by the user, it is completely transparent—no PIN codes that must be entered on start-up or anything else. The only time the user must actively do something is when the phone is actually lost

The invention claimed is:

1. A mobile communication apparatus for communicating via a telecommunication network, comprising:
   a control unit configured to control operations of the apparatus, including receiving messages; and
   locking means configured to detect codes in the received messages responsive to detecting a lock code, and to send a lock command to the control unit to render the mobile communication apparatus at least partially inoperable,
   wherein, when rendered partially inoperable, the apparatus is configured to maintain contact with the telecommunication network and to receive additional commands for remotely controlling operations of the apparatus, and wherein the additional commands include a command to upload specific information from the apparatus to a remote receiver via the telecommunication network, further comprising:
   a card reader configured to read a smart card containing control information for the apparatus, wherein the locking means, when activated, is configured to automatically lock the apparatus when the smart card is replaced by another smart card.

2. An apparatus according to claim 1, wherein the apparatus is configured to receive a first unlocking code to restore the apparatus to normal operation when the apparatus is rendered at least partially inoperable.

3. An apparatus according to claim 2, wherein the apparatus is configured to receive a second unlocking code to restore the apparatus to normal operation when the apparatus is rendered at least partially inoperable.

4. An apparatus according to claim 3, wherein the first unlocking code and the second unlocking code comprise a same code.

5. An apparatus according to claim 1, wherein the smart card is a SIM card.

6. An apparatus according to claim 1, wherein the specific information includes phone book, messages, images, settings, and/or other user data.

7. An apparatus according to claim 1, wherein the apparatus is configured to keep track of its position and to receive a command to upload information about the position to a remote receiver via the telecommunication network.

8. An apparatus according to claim 1, wherein the specific information comprises personal data, and further comprising:

a plurality of registers configured to store the personal data therein, wherein the apparatus is configured to empty the plurality of registers after receiving a command to upload the specific information from the apparatus to the remote receiver.

9. An apparatus according to claim 1, wherein the commands include a command to lock a smart card containing control information for the apparatus to prevent the smart card from being used in another apparatus.

10. An apparatus according to claim 9, wherein the smart card is a SIM card, and wherein the command is a command to activate the SIM card PIN code.

11. An apparatus according to claim 1, further comprising:

a display coupled to the control unit, wherein the control unit is configured to upload the specific information from the apparatus to the remote receiver via the telecommunication network responsive to receiving the command to upload the specific information without providing an indication thereof on the display.

* * * * *